United States Patent [19]
Mickelson

[11] Patent Number: 6,031,487
[45] Date of Patent: Feb. 29, 2000

[54] GPS PSEUDOLITE AND RECEIVER SYSTEM USING HIGH ANTI-JAM PSEUDOLITE SIGNAL STRUCTURE

[75] Inventor: Wilmer A. Mickelson, Cedar Rapids, Iowa

[73] Assignee: Rockwell Collins, Inc., Cedar Rapids, Iowa

[21] Appl. No.: 09/047,566

[22] Filed: Mar. 25, 1998

[51] Int. Cl.[7] ............................... G01S 5/02; H04B 7/185
[52] U.S. Cl. ............................... 342/357.12; 342/357.06; 701/213
[58] Field of Search ............................... 342/18, 357.06, 342/357.12, 16; 701/213

[56] References Cited

U.S. PATENT DOCUMENTS

| | | | |
|---|---|---|---|
| 4,928,106 | 5/1990 | Ashjaee et al. | 342/352 |
| 5,192,957 | 3/1993 | Kennedy | 342/357 |
| 5,311,194 | 5/1994 | Brown | 342/357 |
| 5,702,070 | 12/1997 | Waid | 244/183 |
| 5,708,440 | 1/1998 | Trimble et al. | 342/357 |
| 5,786,773 | 7/1998 | Murphy | 340/947 |
| 5,884,214 | 3/1999 | Krasner | 701/207 |

*Primary Examiner*—Thomas H. Tarcza
*Assistant Examiner*—Dao L. Pham
*Attorney, Agent, or Firm*—Kyle Eppele; James P. O'Shaughnessy

[57] ABSTRACT

Disclosed is a GPS pseudolite transmitter, receiver and navigation system. The GPS pseudolite transmitter is adapted to transmit a first phase modulated L-band signal at a first signal pulse repetition rate having an associated first period time duration. The first phase modulated L-band signal is modulated with a short period code having a code epoch of at least about one millisecond. For each consecutive transmission pulse having the first period time duration, the pseudolite transmitter transmits the first phase modulated L-band signal during less than one half of the first period time duration, and for at least about 1 millisecond so that the first pseudolite transmitter transmits an epoch of the short period code during each transmission pulse. A receiver is adapted to receive the first phase modulated L-band signal from the first pseudolite transmitter, at times when it is not integrating phase modulated L-band signals from other GPS pseudolites transmitters, such that cross-correlation with other phase modulated L-band signals is minimized. Furthermore, the receiver is adapted to receive the L-band satellite signal during intervals when no pseudolite signals are being received.

17 Claims, 5 Drawing Sheets

GPS PSEUDOLITE AND RECEIVER SYSTEM USING HIGH ANTI-JAM PSEUDOLITE SIGNAL STRUCTURE

The U.S. Government has a paid-up license in this invention and the right in limited circumstances to require the patent owner to license others on reasonable terms as provided for by the terms of the contract number F04701-96-C-0039 awarded by the United States Air Force.

FIELD OF THE INVENTION

The present invention relates to ground, ship, or aircraft based global positioning system (GPS) like transmitters (pseudolites). More particularly, the present invention relates to a pseudolite anti-jam signal format, and GPS receivers and systems adapted to use the same.

BACKGROUND OF THE INVENTION

The GPS, or other global navigational satellite systems (GNSS), can be used to determine the position of a user on or near the earth from signals received from multiple orbiting satellites, sometimes referred to as space vehicles (SVs). The latitude, longitude, and altitude of any point close to the earth can be calculated from the times of reception of the electromagnetic signals from four or more satellites to the unknown location of a GPS or GNSS receiver. In the GPS satellite constellation, each satellite transmits two spread-spectrum signals in the L-band, known as L1 and L2. The L1 signal is transmitted at a center frequency of 1575.42 MHz, while the L2 signal is transmitted at a center frequency of 1227.6 MHz.

The L1 signal from each satellite is modulated by two pseudo-random codes, the coarse acquisition (C/A) code and the P-code. The P-code is normally encrypted, with the encrypted version of the P-code referred to as the Y-code. The P and Y codes are often referred to as the P(Y)-code. The L2 signal from each satellite is modulated by the P(Y)-code.

Intentional and unintentional jamming of GPS satellite C/A-code and P(Y)-code signals prevents signal acquisition and tracking by GPS receivers. The relatively low power of GPS satellite signals facilitates the ease of their jamming. Terrestrial based (i.e., ground, ship or aircraft based) GPS transmitters, sometimes referred to as pseudolites, can be used to transmit the L1 and L2 signals. These pseudolites can be used to increase the jamming levels at which GPS acquisition and navigation can be achieved by providing much higher signal power than that provided by the GPS satellites. It is feasible to provide pseudolite signal power levels 30 to 60 dB greater than GPS satellite signal power levels. The result is that the adversary needs to develop 30 to 60 dB greater jammer power to jam the pseudolite signals than is required to jam the GPS satellite signals.

Pseudolites and their higher power GPS signals provide certain disadvantages or problems. For example, the high power GPS pseudolite C/A signals can cross-correlate with the lower power GPS satellite signals, thereby denying the normal GPS signal acquisition and C/A code tracking. Further, the GPS pseudolite signals from one pseudolite can actually cross-correlate with the signals from another more distant pseudolite. This unintentional signal cross-correlation jamming is sometimes referred to as the near/far problem. Additionally, the high power pseudolite signals act as broad band jammer signals when attempting to track the low power GPS satellite signals, thereby jamming the low power GPS satellite signals.

SUMMARY OF THE INVENTION

Disclosed is a GPS pseudolite transmitter, receiver and navigation system. The GPS pseudolite transmitter is adapted to transmit a first phase modulated L-band signal at a first signal pulse repetition rate having an associated first period time duration. The first phase modulated L-band signal is modulated with a short period code having a code epoch of at least about one millisecond. For each consecutive transmission interval having the first period time duration, the pseudolite transmitter transmits the first phase modulated L-band signal during less than one half of the first period time duration, and for at least about 1 millisecond so that the first pseudolite transmitter transmits an epoch of the short period code during each transmission pulse. A receiver is adapted to receive the first phase modulated L-band signal from the first pseudolite transmitter, at times when it is not integrating phase modulated L-band signals from other GPS pseudolites transmitters or from GPS satellites, such that cross-correlation with other phase modulated L-band signals is minimized.

DETAILED DESCRIPTION OF THE PREFERRED EMBODIMENTS

It is widely recognized that the GPS signal acquisition process is more sensitive to jamming of the GPS signal than is the signal tracking process once acquired. In addition, GPS signal acquisition is very sensitive to cross-correlation type jamming (i.e., spoofing) when a short period code such as the C/A code is used.

Stationary or mobile GPS satellite like transmitters, positioned on the earth, on ships or in aircraft, are referred to herein as pseudolites. Pseudolites provide the capability to navigate in the presence of much higher jamming than is possible with the GPS satellite signals.

One objective of deploying a set of pseudolites is to extend the jamming level at which GPS navigation is provided. The pseudolites should also provide accurate time initialization, satellite ephemeris data and initialization of the security data required by the user. Finally, the pseudolite down link (e.g., 50 Hz) data can also be used as a mechanism to transmit satellite differential corrections if desired and if doing so does not require too high of a data rate.

Figure 1:
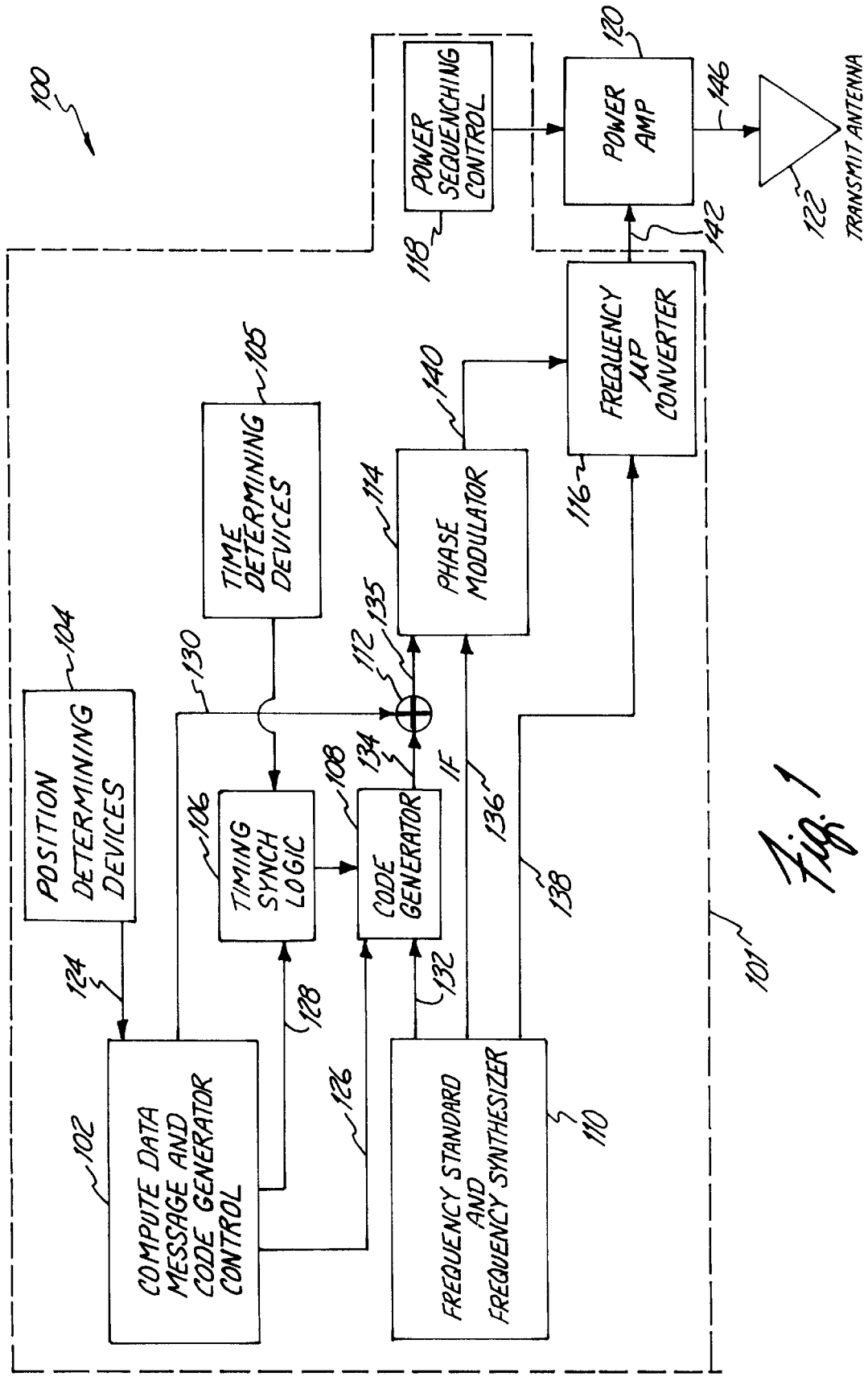
FIG. 1 is a block diagram illustrating a GPS pseudolite in accordance with an embodiment of the present invention.

The time to first fix (TTFF) using pseudolites should be similar to that attained using satellite signals. However, it is recognized that initialization with pseudolites and then acquiring the satellite signal will require more time than the normal initialization FIG. 1 is a block diagram illustrating one possible embodiment of pseudolite 100 in accordance with the present invention. Pseudolite 100 is adapted for use with a GPS satellite constellation or with a multiple pseudolite system to increase the jamming power required to jam the GPS signals. At the same time, pseudolite 100 is adapted to minimize cross-correlation type jamming of GPS satellite signals and of GPS pseudolite signals from more distant pseudolites. Pseudolite 100 can be a stationary GPS signal transmitter, or can be mobile as is the case with aircraft or ship based GPS pseudolite transmitters.

Pseudolite 100 is adapted to generate and transmit GPS signals, similar to those transmitted by GPS satellites, which contain a down link data message and C/A and/or P(Y) codes. The particular embodiment of pseudolite 100 illustrated in FIG. 1 is provided as an example, but is not intended to limit the present invention to a particular implementation of the inventive concepts. In the illustrated embodiment, pseudolite 100 includes signal generating circuitry 101, power amplifier 120 and transmit antenna 122. Signal generating circuitry 101 is adapted to generate a phase modulated L-band frequency GPS signal, of a type which is similar to conventional GPS satellite phase modulated signals, and containing a known message data format. For example, in some preferred embodiments, the signal generating circuitry 101 generates phase modulated GPS signals having the same 50 Hz message data rate as is used by satellites in the GPS constellation. However, message data rates other than 50 Hz can be used as well.

The GPS signal structure used by pseudolite 100 can be of the type which is well known in the art and which can be described in an exemplary embodiment as shown below. The total L-band output signal S from a pseudolite can be determined using equations 1, 2 and 3.

$$S = S_1 + S_2 \text{ total output signal} \qquad \text{Equation 1}$$

where, $$S_1 = A_{P1} * P_i(t) * D_i(t) \cos \omega_1 t + A_C * C_i(t) * D_i(t) \sin \omega_1 t \qquad \text{Equation 2}$$

and $$S_2 = A_{P2} * P_i(t) * D_i(t) \cos \omega_2 t \qquad \text{Equation 3}$$

With, $A_{P1}$=constant magnitude of P-code signal on L1;

$A_C$=constant magnitude of C/A-code signal on L1;

$A_{P2}$=constant magnitude of P-code signal on L2;

$P_i(t)$=P-code sequencer (+1 or −1) for the $i^{th}$ SV or pseudolite. This sequence has a chipping rate of 10.23 MHz and is one week long;

$C_i(t)$=C/A code sequence (+1 or −1) for the $i^{th}$ SV or pseudolite. This sequence has a chipping rate of 1.023 MHz and is 1,023 chips long. It repeats each 1 msec;

$D_i(t)$=Down link data (+1 or −1 corresponds to 1 or 0 in data) which is 50 Hz data in GPS; and $\omega_1, \omega_2$=rad/sec freq. for L1 and L2.

The products $P_i(t)*D_i(t)$ and $C_i(t)*D_i(t)$ are used to modulate the L1 and L2 carriers. Note the following: (1) data does not need to be applied to both codes and/or carriers; (2) one or two carriers can be used; and (3) one or two codes can be used.

Pseudolite 100 differs from conventional GPS satellite or pseudolite transmitters in at least one very important respect. Signal generating circuitry 101 is designed such that, in order to minimize cross-correlation or jamming of GPS satellite signals or signals from other pseudolites, the signal is transmitted (i.e., the transmission pulse width) during only a small portion of the 20 msec period or interval associated with the 50 Hz pulse repetition rate. For example, in some preferred embodiments, pseudolite 100 transmits pulses at the 50 Hz message data rate, but only at a 5 or 10 percent duty cycle. This important aspect of pseudolite 100 of the present invention is discussed below in greater detail with reference to FIG. 2.

In one exemplary embodiment of pseudolite 100, signal generating circuitry 101 includes circuitry or devices adapted to implement the function described below. While the various functions described below are referred to as being implemented by specific circuitry, it must be understood that many of these functions can be implemented within a single device. For example, a microprocessor can be programmed to implement many of the described functions.

As illustrated, signal generating circuitry 101 includes data message computation and code generator control circuitry 102, position determining devices 104, time determining device 105, timing synchronization logic 106, code generating circuitry 108, frequency standard and frequency synthesizer generating circuitry 110, summing node 112, phase modulator 114, frequency up-converter 116 and power sequencing control circuitry 118. Positioning determining devices 104 can include a GPS receiver, an inertial navigation system (INS), or other position determining devices. Time determining device 105 can include a GPS receiver. Output 124 of position determining devices 104 can simply identify the current position of pseudolite 100. However, if pseudolite 100 is positioned on an aircraft or is otherwise mobile, output 124 of position determining device 104 can also be indicative of the velocity and heading of pseudolite 100.

Circuitry 102 generates at output 130 a down link data message stream. In some preferred embodiments, the data message stream has the same 50 Hz message data rate used in conventional GPS satellites. Circuitry 102 also provides an output 128 to timing synchronization logic 106 which is used for initialization of code generating circuitry 108. Also, at output 126, circuitry 102 generates control signals for controlling code generator 108.

Frequency standard and frequency synthesizer circuitry 110 generates the frequency standard reference frequency and various other derivative frequencies typically used in GPS satellites. Using the frequency standard reference frequency provided at output 132, code generator 108 provides at output 134 a 1.023 MHz C/A code and a 10.23 MHz P(Y) code. At summation node 112, the 50 Hz data message provided at output 130 is combined with the C/A code and the P(Y) code. These signals are provided at output 135 to phase modulator 114. Phase modulator 114 receives an intermediate frequency (IF) signal 136 provided by frequency synthesizer 110 and the combined data message and C/A and P(Y) codes at summation node outputs 135, and provides as an output signal 140 having the intermediate frequency, but modulated with the C/A code, the P(Y) code and the downlink data from the 50 Hz data message. Using the phase modulated signal provided at output 140 and a frequency input provided at frequency synthesizer output 138, frequency up-converter 116 provides at output 142 a phase modulated L-band frequency GPS signals (i.e., the L1 and L2 signals).

Power sequencing control circuitry 118 receives precise time from the time determining device 105 and generates control signals 144 which cause power amplifier 120 to amplify and transmit through antenna 122 the phase modulated L-band frequency GPS signal 142 only during a small portion of the 20 msec period usually associated with a 50 Hz message data rate in GPS satellites. It is preferable that the power pulse interval be synchronous with the 1 msec C/A code epoch and contain an integer number of such epochs. Thus, amplified output 146 provided by power amp 120 will include the phase modulated L-band frequency signal only during 1 or 2 msec out of every 20 msec. Transmit antenna 122 transmits the reduced duty cycle GPS signal 146 for receipt and use by GPS receivers in signal acquisition and in navigation. It must be noted that, while the reduced duty cycle aspect of pseudolite 100 is implemented in FIG. 1 by power sequencing control circuitry 118 controlling power amplifier 120, this function could also be implemented at numerous other locations within signal generating circuitry 101. The present invention is intended to cover any implementation of signal generating circuitry 101, or of pseudolite 100 in general, which limits the transmission of the phase modulated L-band signal to a small portion of the 20 ms transmission period and containing at least one C/A code epoch.

Figure 2:
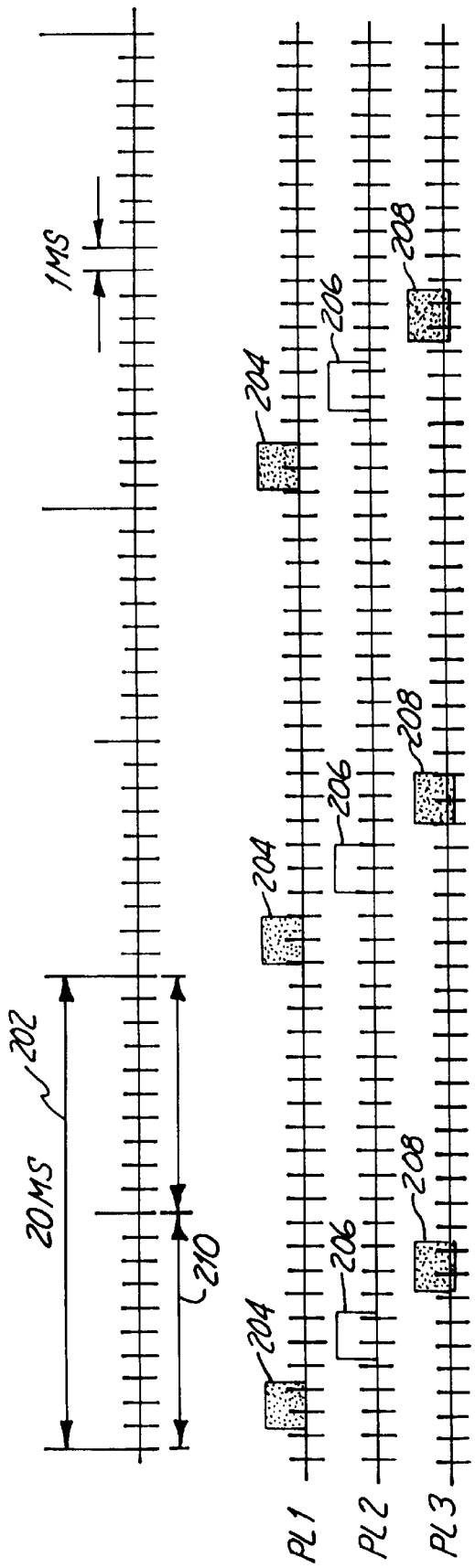
FIG. 2 is a timing diagram illustrating one preferred GPS pseudolite signal structure in accordance with the present invention.

FIG. 2 is a timing diagram illustrating the pulsed L-band transmission technique implemented by pseudolites of the present invention. Illustrated in FIG. 2 are a timeline showing a 20 ms transmission period or interval 202 corresponding to a 50 Hz data rate. While conventional GPS satellites transmit their phase modulated L-band signals during the entire 20 ms interval 202 associated with a 50 Hz data rate, pseudolites of the present invention transmit their phase modulated L-band signals for a reduced portion of the 20 ms interval 202. Alternatively stated, the transmission pulse width or duty cycle of pseudolites of the present invention is less than that of conventional GPS satellites.

A first pseudolite PL1 transmits its phase modulated L-band signal only during the 2 ms portion 204 of each transmission interval 202. If only pseudolite PL1 were being used, portion 204 of transmission interval 202 could be as much as 50percent of interval 202 (i.e., 10 ms). Then, pseudolite PL1 would transmit during half 210 of every transmission interval 202. The GPS satellites transmit their L-band signals continuously. Without any pseudolite transmissions during half interval 212, pseudolite PL1 would not jam the satellite signals.

In situations where multiple pseudolites are transmitting, pseudolite transmission over the entire half period 210 could lead to cross-correlation of the pseudolite signals. Therefore, in these situations, the pseudolites are controlled so that the portion of each period during which any one pseudolite transmits does not overlap with the portions of the same interval during which the other pseudolites transmit. This sequential transmission method is referred to herein as slow pulse sequential transmission. As illustrated in FIG. 2, second pseudolite PL2 transmits during 2 ms portion 206 of each interval 202. Third pseudolite PL3 transmits during 2 ms portion 208 of each interval 202. Thus, because of this slow pulse sequential method, cross-correlation jamming between pseudolites does not occur. To prevent cross-correlation jamming of GPS satellite signals, all of the portions of interval 202 during which the various pseudolites transmit should be contained within half interval 210. In this manner, GPS receivers can receive satellite signals during second half interval 212. This will allow nearly fifty percent duty cycle in which to receive L1 satellite signals without being jammed by the L1 pseudolite signal. Furthermore, it enables the L1 user to receive satellite signals when J/S levels permit without being jammed by the pseudolite signals.

Figure 3:
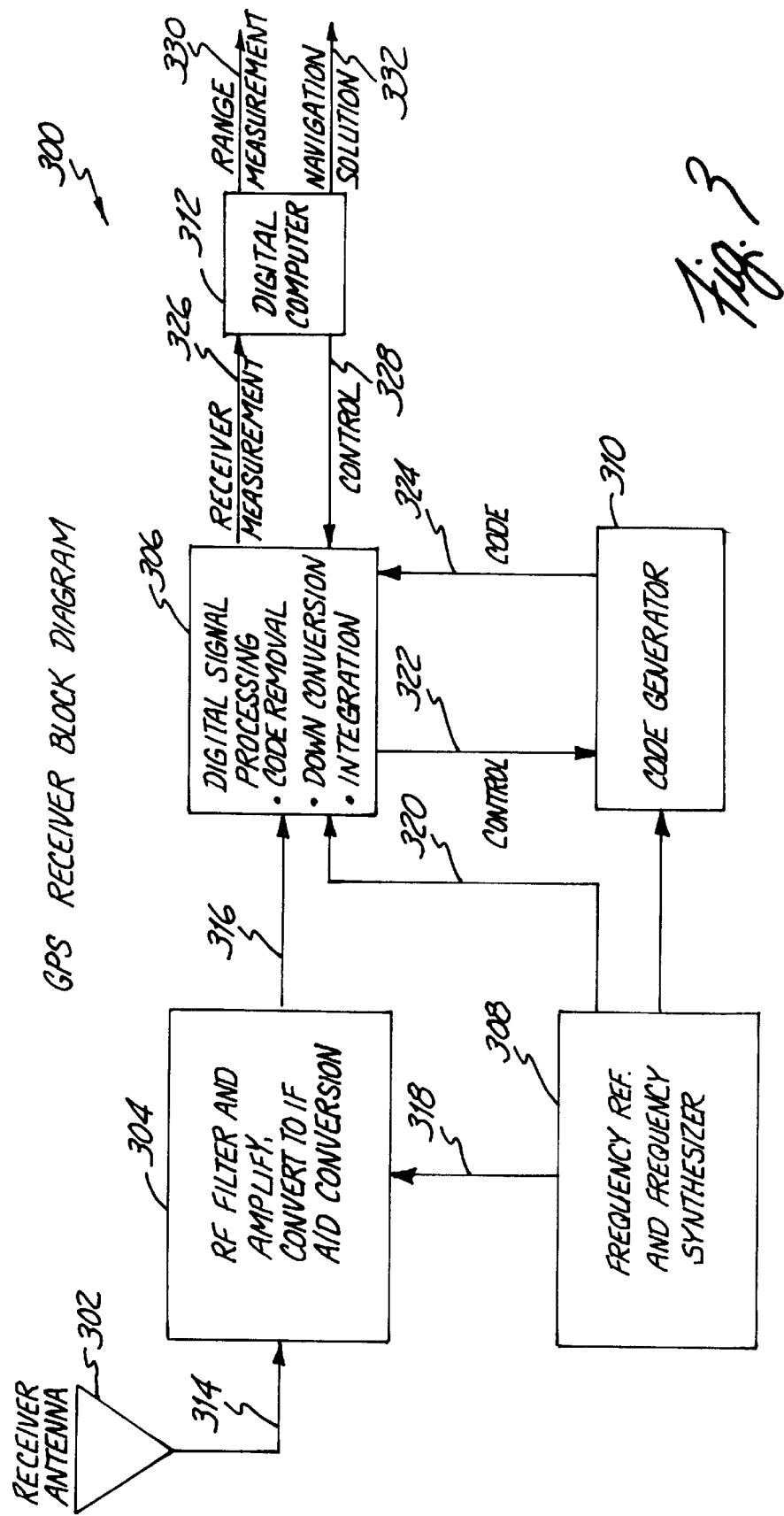
FIG. 3 is a block diagram illustrating a GPS receiver adapted to process GPS signals from GPS pseudolites.

FIG. 3 is a block diagram illustrating GPS receiver 300 which is adapted for use with slow pulse sequential GPS pseudolite systems of the present invention GPS receiver 300 includes antenna 302, analog signal processing and A/D conversion circuitry 304, digital signal processing circuitry 306, reference frequency generating and frequency synthesizing circuitry 308, code generator 310 and digital computer 312. Antenna 302 receives GPS pseudolite signals and GPS satellite signals and provides the received signals 314 to analog signal processing circuitry 304. Analog signal Processing circuitry 304 filters and amplifies the received phase modulated L-band signals. Circuitry 304 also converts the signals to an intermediate frequency using intermediate frequency signal 318 from circuitry 308. Finally, circuitry 304 performs analog to digital conversion on the intermediate frequency converted GPS signals and provides the digitized output to digital signal processor input 316.

As controlled by digital signal processing circuitry 306 via control line 322, code generator 310 uses a specific frequency signal from circuitry 308 to generate a reference code signal 324. Under the control of digital computer 312 via control line 328, and using reference code 324 from code generator 310, digital signal processor 306 removes the C/A and P(Y) code from the digitized GPS signals. Once the codes are removed, circuitry 306 down coverts the signal to base band. As is the case in conventional GPS receivers, digital signal processing circuitry 306, or some other circuitry within the receiver, integrates the bits to recover the signal in the presence of noise.

Since the pseudolites of the present invention transmit their respective signals only over a reduced portion of the 20 ms period, integrating the signal from the currently tracked pseudolite over the entire 20 ms period results in an excessive integration of noise and ultimately in increased errors. According to the present invention, receiver 300 integrates the signal from the currently tracked pseudolite only during the same portion of the 20 ms period that the tracked pseudolite transmits. Thus, in some embodiments of the present invention, circuitry 306 of receiver 300 integrates for only 2 ms out of each 20 ms period when acquiring and/or tracking pseudolites. Furthermore, the receiver 300 integrates satellite signals only during those periods when no pseudolite is transmitting. Using control line(s) 328, digital computer 312 controls which satellite's or pseudolite's signals are processed. When controlling circuitry 306 to process signals from a particular source, computer 312 can also control the integration time implemented by circuitry 306 accordingly.

Digital signal processing circuitry 306 provides as an output data 326 containing down link data and measurements. Digital computer 312 uses data 326 and generates a range measurement 330 and a navigation solution 332 for receiver 300.

Figure 4:
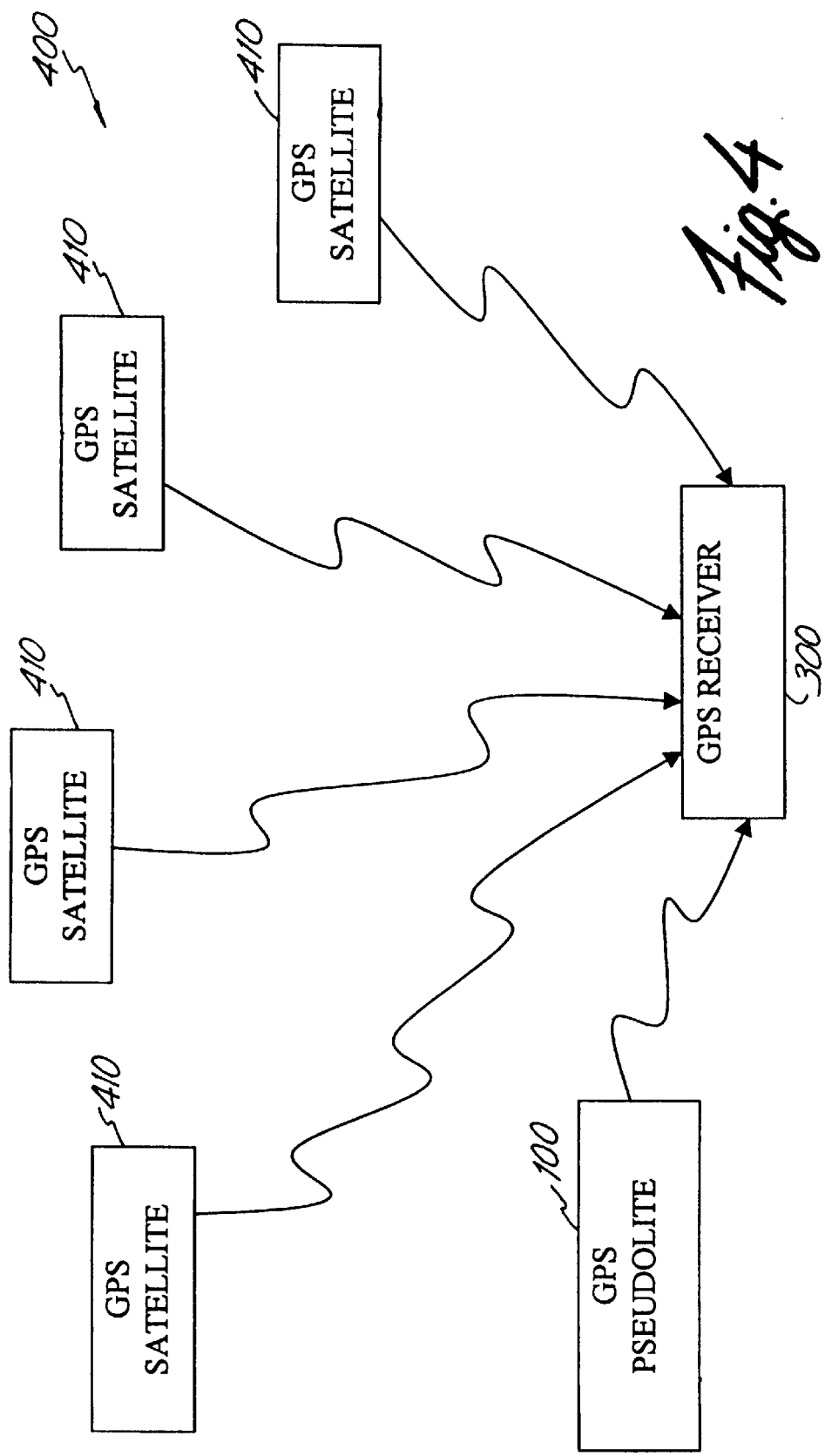
FIG. 4 is a diagrammatic illustration of one particular GPS system in which a GPS receiver utilizes both GPS pseudolite signals and GPS satellite signals for signal acquisition and navigation.

FIG. 4 is a block diagram illustrating GPS navigation system 400 in accordance with embodiments of the present invention. Navigation system 400 includes GPS receiver 300, GPS pseudolite 100, and four or more GPS satellites 410. In system 400, GPS pseudolite 100 transmits its L-band phase modulated signal at a reduced duty cycle, as discussed above. The transmission width or duty cycle of pseudolite 100 should not exceed 50 percent of the period of the data rate, which is typically 50 Hz. During the time that pseudolite 100 is transmitting, GPS receiver 300 limits its integration time as discussed above to minimize excessive noise integration. During the second half of each transmission period, GPS receiver is controlled internally to process and integrate signals from the GPS satellites 410.

Since signal acquisition is more difficult in a jammed environment than is signal tracking, GPS receiver 100 first acquires the more powerful signals from pseudolite 100. Then, using a time reference from pseudolite 100, acquisition and tracking of signals from GPS satellites 410 is more readily accomplished. Then, GPS receiver 300 can navigate using only signals from GPS satellites 410, or using a combination of signals from GPS satellites 410 and signals from GPS pseudolite 100.

Figure 5:
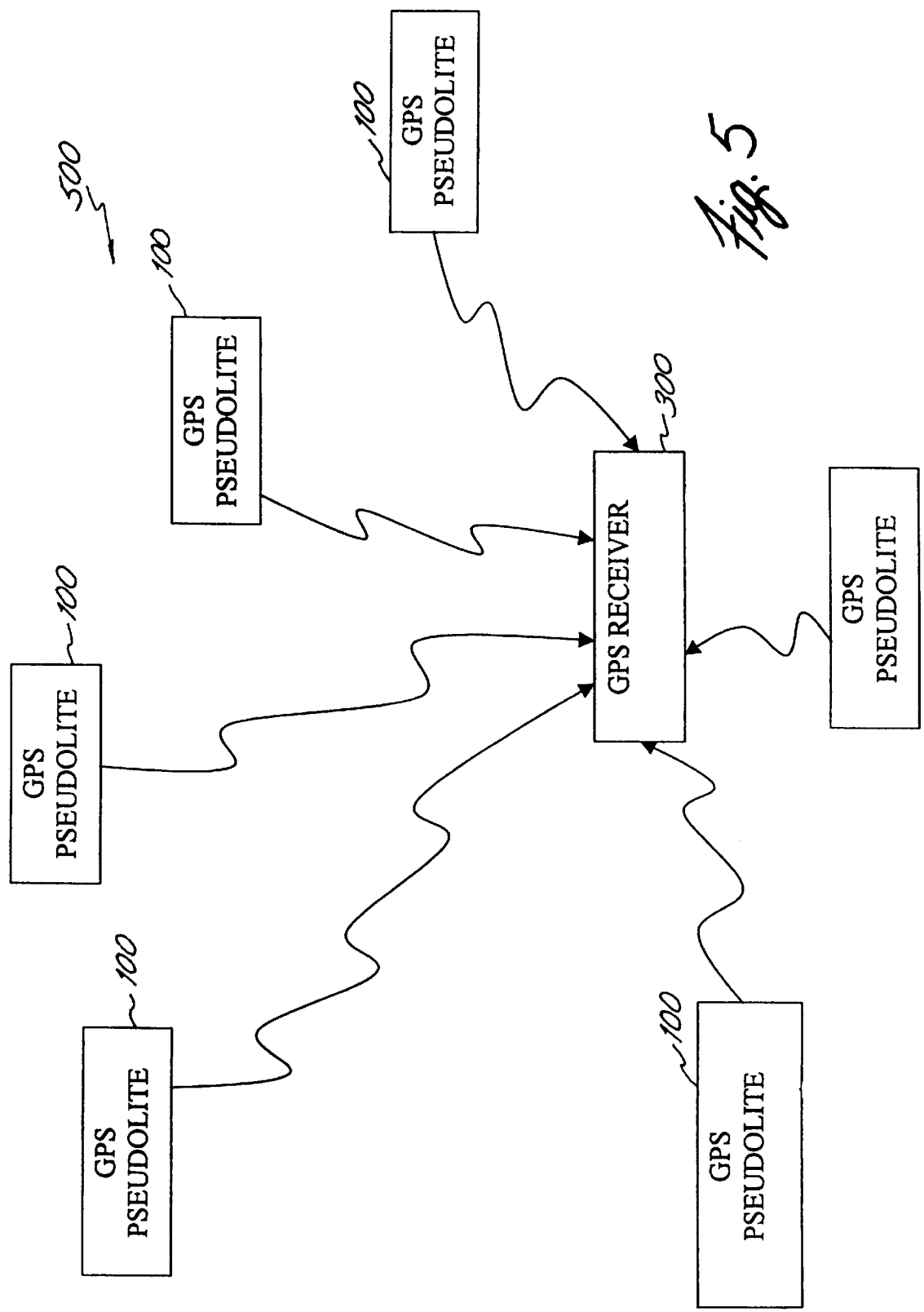
FIG. 5 is a diagrammatic illustration of another particular embodiment of a GPS system in which a GPS receiver utilizes only GPS pseudolite signals for signal acquisition and navigation.

FIG. 5 is a block diagram illustrating GPS navigation system 500 in accordance with alternate embodiments of the present invention. System 500 includes GPS receiver 300 and at least four GPS pseudolites 100. In the preferred embodiment illustrated, system 500 includes six GPS pseudolites. GPS receiver 300 functions as described above to identify signals from each of GPS pseudolites 100, and to integrate the received signals only during the corresponding appropriate portions of the transmit data period. In preferred embodiments of the present invention in which pseudolites 100 are positioned on aircraft, the flight paths of the aircraft are preferably controlled so that four of the pseudolites are moving in a straight line at any given time, while the other two pseudolites are turning. In this pseudolite only navigation system, GPS receiver 300 uses the phase modulated L-band signals from the pseudolites for both signal acquisition and for navigation solution determination.

The present invention avoids a near/far cross correlation problem when acquiring and/or tracking pseudolites by using a slow pulse sequential signaling design wherein the receiver integrates the signal only over the pulse interval. Other pseudolite signaling designs have used a fast pulse design wherein the pulse period is less than 100 microseconds and the pulse repetition rate is at least 1000 pulses per second. Present receiver designs and technology constraints do not provide the capability to selectively integrate the signal only during the very short pulse periods. Instead, the receiver must integrate the signal over the total iteration period or interval (usually 20 milliseconds). Consequently, the fast pulse pseudolite design is subject to the near/far cross correlation problem unless only very low duty cycles are used. Additionally, it provides inferior jamming resistance because it integrates noise over the entire iteration period or interval rather than only during the pulse when the pseudolite power is present.

Although the present invention has been described with reference to preferred embodiments, workers skilled in the art will recognize that changes may be made in form and detail without departing from the spirit and scope of the invention. For example, references herein to the GPS are also intended to include non-GPS GNSS.

What is claimed is:

1. A global positioning system (GPS) type navigation system comprising:
    a first pseudolite transmitter adapted to transmit a first phase modulated L-band signal at a first signal pulse repetition rate, the first phase modulated L-band signal being modulated with a short period code having a code epoch of at least about one millisecond, the first signal pulse repetition rate having a first period time duration associated therewith, wherein for each of a plurality of consecutive transmission intervals having the first period time duration the pseudolite transmitter transmits the first phase modulated L-band signal during less than about one half of the first period time duration, and for at least about 1 millisecond so that the first pseudolite transmits an epoch of the short period code during each transmission pulse; and
    a receiver adapted to receive the first phase modulated L-band signal.

2. The navigation system of claim 1, wherein the short period code is a C/A code.

3. The navigation system of claim 1, wherein the first signal pulse repetition rate is 50 pulses per second and the corresponding first period time duration is 20 milliseconds, the first pseudolite transmitter transmitting the first phase modulated L-band signal for between 1 millisecond and 10 milliseconds out of each 20 millisecond transmission interval.

4. The navigation system of claim 1, wherein the receiver is adapted to integrate received phase modulated L-band signals from GPS satellites during each of the plurality of consecutive transmission intervals only during portions of the transmission intervals in which the first pseudolite is not transmitting.

5. The navigation system of claim 1, and further comprising a plurality of pseudolite transmitters adapted to transmit modulated L-band signals at the first pulse repetition rate, wherein each of the plurality of pseudolite transmitters transmits its corresponding phase modulated L-band signal only during a corresponding portion of each of the plurality of consecutive transmission intervals, and wherein the corresponding portions of each of the plurality of consecutive transmission intervals during which the plurality of pseudolites transmit their respective phase modulated signals are non-overlapping.

6. The navigation system of claim 5, wherein a total of the corresponding portions of each transmission intervals during which the plurality of pseudolites transmit their respective phase modulated signals is less than about one half of the first period time duration.

7. The navigation system of claim 5, wherein the receiver is adapted to integrate received phase modulated L-band signals from one of the plurality of pseudolite transmitters during each of the plurality of consecutive transmission intervals only during the portion of the transmission intervals in which the others of the plurality of pseudolite transmitters are not transmitting.

8. The navigation system of claim 7, wherein the receiver is adapted to integrate received phase modulated L-band signals from one of the plurality of pseudolite transmitters during each of the plurality of consecutive transmission intervals substantially only during the portion of the transmission intervals in which the one of the plurality of pseudolite transmitters is transmitting.

9. The navigation system of claim 5, wherein the phase modulated L-band signal transmitted by at least one of the plurality of pseudolite transmitters is phase modulated using the C/A code for signal acquisition, and wherein the phase modulated L-band signal transmitted by at least two other of the plurality of pseudolite transmitters is phase modulated using the P(Y) code for navigation.

10. The navigation system of claim 1, wherein the signal pulse repetition rate is no greater than 200 pulses per second.

11. A pseudolite transmitter for use in a global positioning system (GPS) type navigation system, the pseudolite transmitter comprising:
    an antenna; and
    signal generating circuitry coupled to the antenna and adapted to generate and transmit through the antenna a first phase modulated L-band signal at a first signal pulse repetition rate, the first phase modulated L-band signal being modulated with a short period code having a code epoch of at least about one millisecond, the first signal pulse repetition rate having a first period time duration associated therewith, wherein for each of a plurality of consecutive transmission intervals having the first period time duration the signal generating circuitry transmits the first phase modulated L-band signal during less than about one half of the first period time duration, and for at least about 1 millisecond so that an epoch of the short period code is transmitted by the pseudolite transmitter during each transmission pulse.

12. The pseudolite transmitter of claim 11, wherein the short period code is a C/A code.

13. The pseudolite transmitter of claim 11, wherein the first signal pulse repetition rate is 50 pulses per second and the corresponding first period time duration is 20 milliseconds, the signal generating circuitry transmitting the first phase modulated L-band signal for between 1 millisecond and 10 milliseconds out of each 20 millisecond transmission interval.

14. The pseudolite transmitter of claim 11, wherein the signal pulse repetition rate is no greater than 200 pulses per second.

15. A global positioning system (GPS) receiver comprising:

an antenna which receives a first phase modulated L-band signal transmitted from a first pseudolite transmitter at a first signal pulse repetition rate, the first phase modulated L-band signal being modulated with a short period code having a code epoch of at least about one millisecond, the first signal pulse repetition rate having a first period time duration associated therewith, wherein for each of a plurality of consecutive transmission intervals having the first period time duration the antenna receives the first phase modulated L-band signal from the first pseudolite transmitter during less than about one half of the first period time duration, and for at least about 1 millisecond so that the received phase modulated L-band signal contains an epoch of the short period code during each transmission pulse;

signal processing circuitry coupled to the antenna, the signal processing circuitry receiving the first phase modulated L-band signal from the antenna and providing as an output a first frequency converted signal indicative of the first phase modulated L-band signal; and integration circuitry coupled to the signal processing circuitry, the integration circuitry integrating the first frequency converted signal for less than one half of the first period time duration during each interval.

16. The GPS receiver of claim 15, wherein the antenna receives phase modulated L-band satellite signals from GPS satellites over the entire first period time duration of each consecutive transmission interval, wherein the signal processing circuitry receives the phase modulated L-band satellite signals and provides as an output frequency converted satellite signals indicative of the received phase modulated L-band satellite signals, and wherein the integration circuitry integrates the frequency converted satellite signals during each of the plurality of consecutive transmission intervals only during portions of the transmission intervals in which the first phase modulated L-band signal from the first pseudolite transmitter is not being received.

17. The GPS receiver of claim 15, wherein the antenna receives a plurality of phase modulated L-band signals from a plurality of pseudolite transmitters, each of the plurality of phase modulated L-band signals from the plurality of pseudolite transmitters being received during a corresponding and non-overlapping portion of each of the plurality of consecutive transmission intervals, wherein the integration circuitry integrates the first frequency converted signal only during the portion of the transmission intervals in which the others of the plurality of phase modulated L-band signals from the plurality of pseudolite transmitters are not being received.

* * * * *